United States Patent
Li et al.

(10) Patent No.: US 11,499,734 B2
(45) Date of Patent: Nov. 15, 2022

(54) CLOUD AND EDGE INTEGRATED ENERGY OPTIMIZER

(71) Applicant: Honeywell International Inc., Charlotte, NC (US)

(72) Inventors: Chunfu Li, Beijing (CN); Petr Endel, Prague (CZ); Karel Marik, Revnice (CZ)

(73) Assignee: Honeywell International Inc., Charlotte, NC (US)

( * ) Notice: Subject to any disclaimer, the term of this patent is extended or adjusted under 35 U.S.C. 154(b) by 74 days.

(21) Appl. No.: 17/190,043

(22) Filed: Mar. 2, 2021

(65) Prior Publication Data

US 2021/0180819 A1  Jun. 17, 2021

Related U.S. Application Data

(62) Division of application No. 16/417,545, filed on May 20, 2019, now Pat. No. 11,041,650.

(51) Int. Cl.
*F24F 11/46* (2018.01)
*F24F 11/58* (2018.01)
(Continued)

(52) U.S. Cl.
CPC .............. *F24F 11/46* (2018.01); *F24F 11/58* (2018.01); *G05B 13/048* (2013.01); *G06F 17/18* (2013.01);
(Continued)

(58) Field of Classification Search
CPC ......... F24F 11/46; F24F 11/58; G05B 13/048; G05B 2219/2639; G05B 2219/2642; G06F 17/18; H02J 1/14; H02J 3/14; H02J 3/003; H02J 2310/14; H02J 2310/64; Y02B 70/3225; Y04S 20/222; H04W 4/38; H04W 4/70; Y02D 30/70; G06Q 10/20
See application file for complete search history.

(56) References Cited

U.S. PATENT DOCUMENTS 9,547,828 B2 * 1/2017 Mermoud ............... H04L 41/16
9,960,637 B2 * 5/2018 Sanders .................... H02J 3/46
(Continued)

FOREIGN PATENT DOCUMENTS

WO  2018009205 A1  1/2018

OTHER PUBLICATIONS

"Brim," Brim Controls—Ecospectral, 5 pages, 2017.
(Continued)

*Primary Examiner* — Ramesh B Patel
(74) *Attorney, Agent, or Firm* — Seager, Tufte & Wickhem LLP

(57) ABSTRACT

An integrated energy optimizer having an edge side and a cloud side. The edge side may incorporate an energy optimizer, a building management system connected to the energy optimizer, a controller connected to the building management system, and equipment connected to the controller. The cloud side may have a cloud connected to the energy optimizer and to the building management system, and a user interface connected to the cloud. Data from the field sensor may go to the optimizer and the building management system. The data may be processed at the optimizer and the building management system for proper settings at the building management system.

2 Claims, 5 Drawing Sheets

(51) Int. Cl.
*G05B 13/04* (2006.01)
*G06F 17/18* (2006.01)
*H02J 1/14* (2006.01)
*H02J 3/14* (2006.01)
*H02J 3/00* (2006.01)

(52) U.S. Cl.
CPC ............... *H02J 1/14* (2013.01); *H02J 3/14* (2013.01); *G05B 2219/2639* (2013.01); *G05B 2219/2642* (2013.01); *H02J 3/003* (2020.01); *H02J 2310/14* (2020.01); *H02J 2310/64* (2020.01); *Y02B 70/3225* (2013.01); *Y04S 20/222* (2013.01)

(56) References Cited

U.S. PATENT DOCUMENTS

| | | | |
|---|---|---|---|
| 10,101,048 | B2 | 10/2018 | Marik et al. |
| 10,262,019 | B1* | 4/2019 | Reiner ............... H04L 67/10 |
| 10,554,170 | B2* | 2/2020 | Drees ............... H02J 3/385 |
| 10,564,610 | B2 | 2/2020 | Drees |
| 10,635,058 | B2* | 4/2020 | Sanders ............... G05B 15/02 |
| 10,686,626 | B2 | 6/2020 | Sarwar et al. |
| 10,721,631 | B2* | 7/2020 | Guan ............... H04W 40/20 |
| 2017/0005515 | A1* | 1/2017 | Sanders ............... G05B 15/02 |
| 2017/0006135 | A1* | 1/2017 | Siebel ............... G06N 20/00 |
| 2017/0060574 | A1* | 3/2017 | Malladi ............... G06F 9/542 |
| 2017/0102675 | A1* | 4/2017 | Drees ............... H02S 50/00 |
| 2017/0209338 | A1* | 7/2017 | Potucek ............... B25J 9/161 |
| 2018/0191867 | A1* | 7/2018 | Siebel ............... H04L 69/40 |
| 2018/0234519 | A1* | 8/2018 | Boyapalle ............... H04L 67/06 |
| 2018/0275625 | A1* | 9/2018 | Park ............... G05B 19/0421 |
| 2019/0026359 | A1* | 1/2019 | Park ............... G06F 16/23 |
| 2019/0094821 | A1* | 3/2019 | Stluka ............... G05B 13/041 |
| 2019/0132145 | A1* | 5/2019 | O'Hora ............... H04L 67/10 |
| 2019/0288556 | A1* | 9/2019 | Sanders ............... H02J 3/32 |
| 2020/0033821 | A1* | 1/2020 | Krishnamurthy ...... G05B 15/02 |
| 2020/0142365 | A1* | 5/2020 | Sharma ............... G05B 15/02 |
| 2021/0003308 | A1* | 1/2021 | Venne ............... G06N 20/00 |
| 2021/0141346 | A1* | 5/2021 | Wenzel ............... G05B 13/048 |

OTHER PUBLICATIONS

"Bringing Intelligence to the Edge with Cloud IoT," Google, 10 pages, Jul. 25, 2018.

"Because We Want a Better World Too", EcoSpectral, 16 pages, 2017.

European Search Report dated Jul. 7, 2020 for Application No. 20175291.2-1222.

* cited by examiner

```
 89    6 references
 90    public ModelVariable()
 91    {
 92    // ReSharper disable  DoNotCallOverridableMethodsInConstuctor
 93        EmsopVariables = new List<EmsopVariable>();
 94    // ReSharper restore  DoNotCallOverridableMethodsInConstuctor
 95        Band = null;
 96        Maxband = 1;
 97        PerformanceIrrelevant = false;
 98        Scale = 1;
 99        this.EstimateStatisticsIntervalDays = 7;
100        //JIRA 151 - Brian Kirkdale - 30 Jan 2014 Changed DateTime.Now to DateTime.UtcNow
101        this.EstimateStatisticsLastRun = DateTime.UtcNow - TimeSPan.FromDays(100);  //DateTime.MinValue fails in Entity Framework
102    }
103    [NotMapped]
104    25 references
105    public ModelVariableAggregationType AggregationType
106    {
107        get { return (ModelVariableAggregationType)InternalModelVariableAggregationType; }
108        set { InternalModelVariableAggregationType = (int)value; }
109    }
110    [NotMapped]
111    17 references
112    public ModelVariableAggregationVariableType AggregationVariableType
113    {
114        get { return (ModelVariableAggregationVariableType)InternalModelVariableAggregationVariableType; }
115        set { InternalModelVariableAggregationVariableType = (int)value; }
116    }
117    [NotMapped]
118    59 references
       public ModelVariableType Type
```

- name:assetHealthSpan
- doc:
- Example: if(val==100) result=val.assetHealthSpan(0, 1000, 0, 100)

- the result will be 10
- dashboard
- func
- override
- mod:2017-10-20T02:52:59.998Z
- src:
- //assetHealthSpan
- (val,inLoLim:0,inHiLim:100,outLoLim:0,out:HiLim:100) =>do
- if (val<=inLoLim) return outLoLim
- else if(val>=inHiLim) return outHiLim
- else return ((val-inLoLim)/(inHiLim-inLoLim))*(outHiLim-outLoLim)
- 
- end
- ---
- name:assetEquipType
- doc:
- Example: assetEquipType(readByld(@equipid))
- dashboard
- func
- override
- mod:2017-10@0T02:52:59.998Z
- src:
- //assetEquipType
- (equip)=>do

FIG. 5

CLOUD AND EDGE INTEGRATED ENERGY OPTIMIZER

This present Application is a divisional of U.S. patent application Ser. No. 16/417,545, filed May 20, 2019. U.S. patent application Ser. No. 16/417,545, filed May 20, 2019, is hereby incorporated by reference.

BACKGROUND

The present disclosure pertains to optimization techniques and particularly to optimization of energy usage relative to climate control of a building.

SUMMARY

The disclosure reveals an integrated energy optimizer having an edge side and a cloud side. The edge side may incorporate an energy optimizer, a building management system connected to the energy optimizer, a controller connected to the building management system, and equipment connected to the controller. The cloud side may have a cloud connected to the energy optimizer and to the building management system, and a user interface connected to the cloud. Data from the field sensor may go to the optimizer and the building management system. The data may be processed at the optimizer and the building management system for proper settings at the building management system.

BRIEF DESCRIPTION OF THE DRAWING

FIG. 4 is a diagram of an example implementation of edge optimization; and

FIG. 5 is a diagram of an example implementation of cloud analytics.

DESCRIPTION

Figure 1:
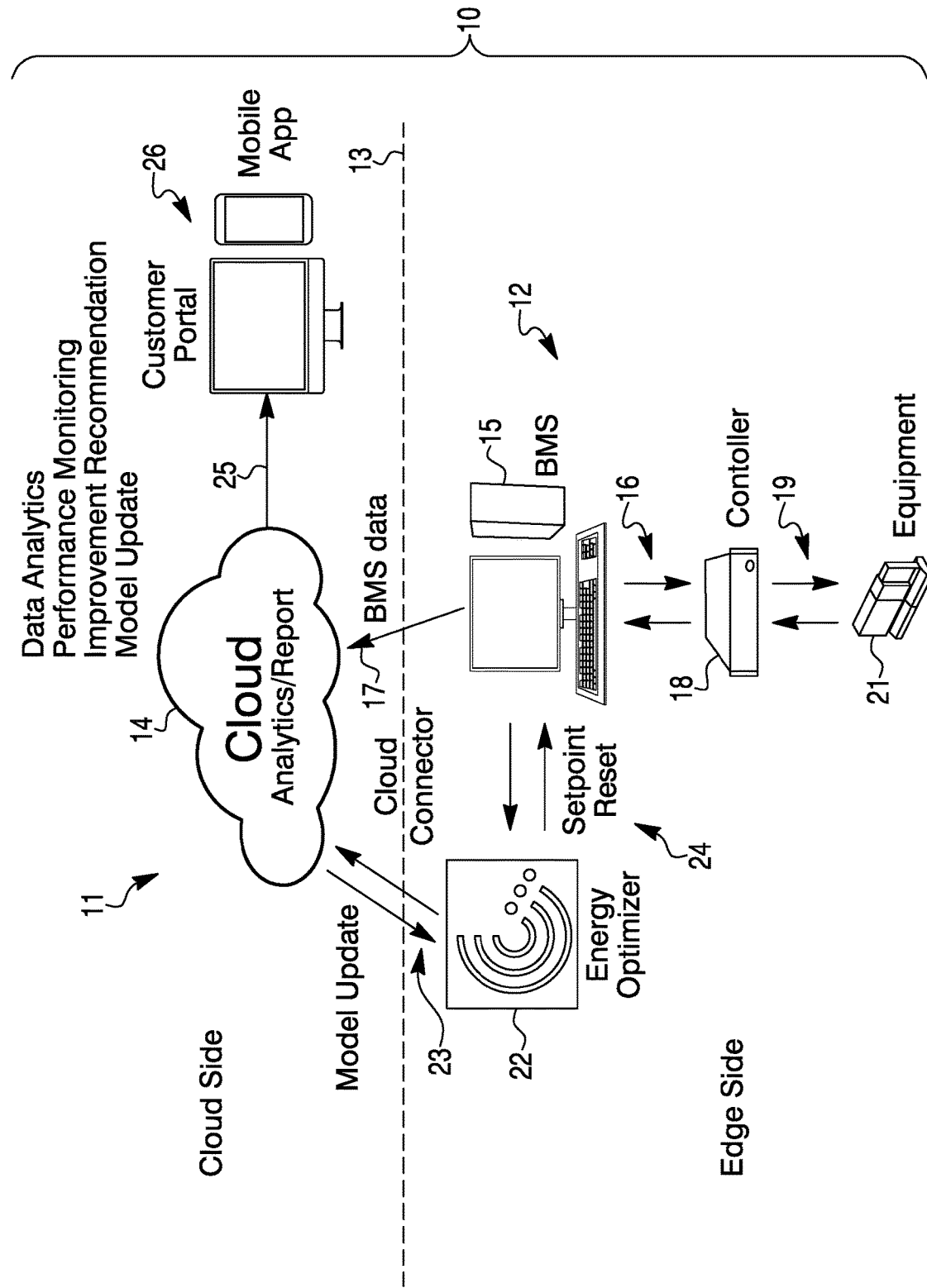
FIG. 1 is a diagram of an architecture for the present system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

An issue addressed herein may be related to optimal heating, ventilation and air conditioning (HVAC) control. An aim of an optimizer type of system is to minimize energy costs while maintaining a zone's comfort level regarding temperature, humidity, and so forth. A product based on it may be a setpoint optimizer that has been applied in many customer sites and piloted on several company sites. The present system may first predict the energy demand of a building and then optimize the setpoints (actions) that can meet the demand with minimal cost based on current measurements of HVAC plant variables.

For building solutions, the energy management setpoint optimizer may collect plant data from a building management system (BMS) and send the data to a cloud, where the optimizer is hosted and optimization is performed. After the optimization results (optimal setpoints) are generated, they may be sent back to the enterprise buildings integrator and the controller setpoints may be changed accordingly.

The solution may have the following limitations. Firstly, there may exist data transfer latency issue for large buildings, which is quite common for home and building system customers. It may take several minutes to transfer several thousand point values from the enterprise buildings integrator to a cloud, while the energy management setpoint optimizer may need real time (or near real time) data to understand the current conditions.

Another limitation is that a setpoint change command may be from the cloud, which gives a customer concern not only for the time issue (although this kind of control is not so time critical as conventional control), but also for information technology (IT) security (e.g., man in the middle attack).

The noted issue may be addressed by splitting an original solution structure into two parts. One may be control and optimization on an edge device. Another may be analytics and model improvement on a cloud. In this way, an optimizer on edge side will not necessarily have a data transfer and control latency issue, while the cloud side may improve the model by leveraging big data analytics and pushing the updated model to an edge device.

The edge side may be noted. Real time data may be collected from a site, and energy optimization may be performed based on historical data, tariff information and a demand forecast periodically, e.g., in a 15 minute step, and with a one hour optimization horizon. Optimized setpoints may be sent to site controllers and the controller setpoints may be reset.

The cloud side may be noted. Equipment performance monitoring and trending, and fault detection and diagnosis may be conducted, and report and visualization may be generated regularly.

Big data analytics may be performed to gain insights from a big amount of building data in the cloud, which can help improve individual building models.

A model update may be initiated from a cloud side and pushed to the edge devices. One advantage is that one common model structure update may be pushed to all the edge devices simultaneously.

Details of a solution may be noted. On the edge side, the solution comprises of connecting the sensor signals to controllers and then sending to the optimization server and building management system like a company enterprise buildings integrator via field bus, such as BACnet™, Modbus™, and so on.

The optimization server may contain an optimization engine which performs energy optimization based on real time data, building model and tariff information, periodically, e.g. every 15 minutes, by minimizing the cost while meeting the comfort requirement. The optimization method (model predictive control (MPC) based) used in U.S. Pat. No. 10,101,048 may still apply here. Optimized setpoints may be sent to site controllers via a building management system and reset.

The building model may be built from historical data using statistical regression with an on-the-fly parameter estimation and that is updated with new data gathered. The building model may be generated locally in the edge side, or built remotely in the cloud side and then downloaded to the edge device.

Data may be pushed to an interne of things (IoT) hub on the cloud at periodic intervals via a cloud connector and then stored in the data store in the cloud.

On the cloud side, data analytics engine may perform the batch data analytics by combining the ontology models and data from different sites and may generate valuable insights including performance monitoring and trending, fault detection and diagnosis, improvement recommendation, which can be pushed to and visualized on customer portal and mobile app via API.

An ontology model may be a meta-data structure which describes the properties of equipment, a facility and building and their relationships. It may help a data analytics engine to understand the building in details and generate insights, accordingly.

By leveraging a large amount of building data in cloud, the data analytics engine can implement big data analytics and improve individual building models. A model update may be initiated from cloud side and pushed to the edge devices.

In the present way, the optimizer on the edge side will not necessarily have data transfer and control latency issue, while the cloud side may improve the model by leveraging big data analytics and push the updated model to the edge side. The system may be an HVAC supervisory control solution with properties as noted herein.

The present system may reduce data transfer and control latency. It may distribute the computational effort from the cloud to the edge.

Insights and/or models may be derived from a big amount of building data in the cloud which can be used to improve individual building models.

Distribution of computational load may be important for deployment of a large number (>100 k) of buildings.

The present system may enable significant energy cost savings (gas, electricity, chilled water, and so forth) by 10 to 40 percent when compared with the state-of-the-art.

The present system may enable deployment of the solution to customers that are sensitive to send sensor data to cloud (e.g., banks).

The system can be developed into one independent energy offering, or integrated into a building management system as one powerful energy related feature.

The present system may improve building management system offering in supervisory closed loop control.

The system may have cloud plus edge computing. There may be control and optimization on the edge while monitoring and tuning on cloud. A model update may be initiated from cloud side and pushed to the edge devices. There may be setpoint optimization on the edge device.

There may be analytics and performance monitoring and trending, fault detection and diagnosis, improvement recommendation.

The system may have a software component. The stack level may involve a cloud, a secure, scalable infrastructure for collecting, aggregating and storing data, allowing connected "things" to communicate, offering a SaaS solution as available, and IaaS/PaaS, data lakes.

A software type may involve connected/connectivity with an offering available thru cloud or direct, remote connection (SaaS) or cover infrastructure enabling connected services (sentience).

There may be an IoT stack Level of a cloud that is a secure, scalable infrastructure for collecting, aggregating and storing data, allowing connected "things" to communicate, offering a SaaS solution, and as available, IaaS/PaaS, and data lakes.

The system may generate or capture data. The type of data may be equipment sensor data. The data may reside in the edge device and the cloud.

FIG. 1 is a diagram of an architecture 10 for the present system. There is a cloud side 11 and an edge side 12. A cloud connector 13 may provide one or more paths between edge side 12 and cloud side 11. A cloud 14, on the cloud side 11, may receive building management system data from building management system 15 along connection 17 on the edge side 12. Building management system 15 may have a two way connection 16 with a controller 18, which has a two way connection 19 with equipment 21. An energy optimizer 22 may have a two way connection 23 with cloud 14 for model update information. Energy optimizer 22 may have a two way connection 24 with building management system 15 for set point reset information. Cloud 14 may have a connection 25 to a display mechanism 26 such as a pad, laptop, cell phone, computer display of one kind or another, a customer portal, and so on. Cloud 14 may perform analytics on information provided to it and provide reports. Cloud 14 may provide data analytics, performance monitoring, improvement recommendations and model update information.

Figure 2:
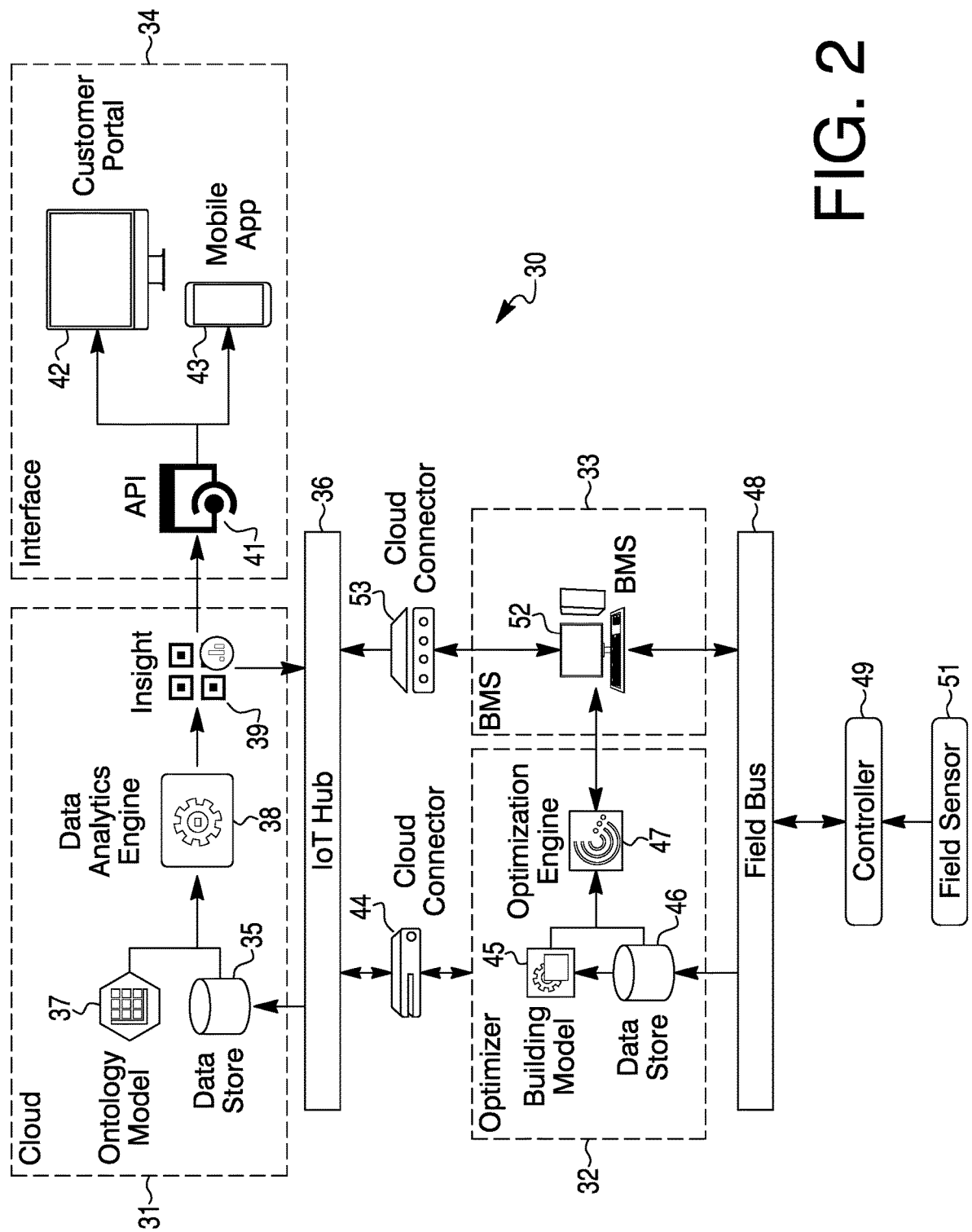
FIG. 2 is a diagram of a solution architecture.

FIG. 2 is a diagram of a solution architecture 30. Major components of architecture 30 may incorporate cloud 31, optimizer 32, building management system module 33, and interface 34. Cloud 31 may receive data to its data store 35 from an IoT hub 36. Data from data store 35 and information from an ontology model 37 may go to a data analytics engine 38. Results from data analytics engine 38 may go to an insight module 39. Insight information may go from module 39 to IoT hub 36 and to an application programmable interface (API) 41 of interface 34. An output from API may go to a customer portal 42, a mobile app 43, and other outputs, of interface 34.

Coming in and going from a cloud connector 44 may be data or information to or from optimizer 32. Optimizer 32 may have a building model module 45. A data store 46 may have an output to module 45 and an output to an optimizer engine 47. Data store 46 may have an input from a field bus 48 which may have a two-way connection with a controller 49, which may monitor or control information or data from one or more field sensors 51, to or from field bus 48. Field sensors 51 may be placed so as to obtain data of a building, facility, enclosed environment, and/or the like, relating to temperature, humidity, noise, fumes, physical disturbance, and/or other detectable parameters.

A building management system 52 of building management system module 33 may have a two-way connection with field bus 48 and another two-way connection with optimization engine 47 of optimizer 32. Another cloud connector 53 may have an input from building management system 52 of module 33 and an output connected to IoT hub 36.

Figure 3:
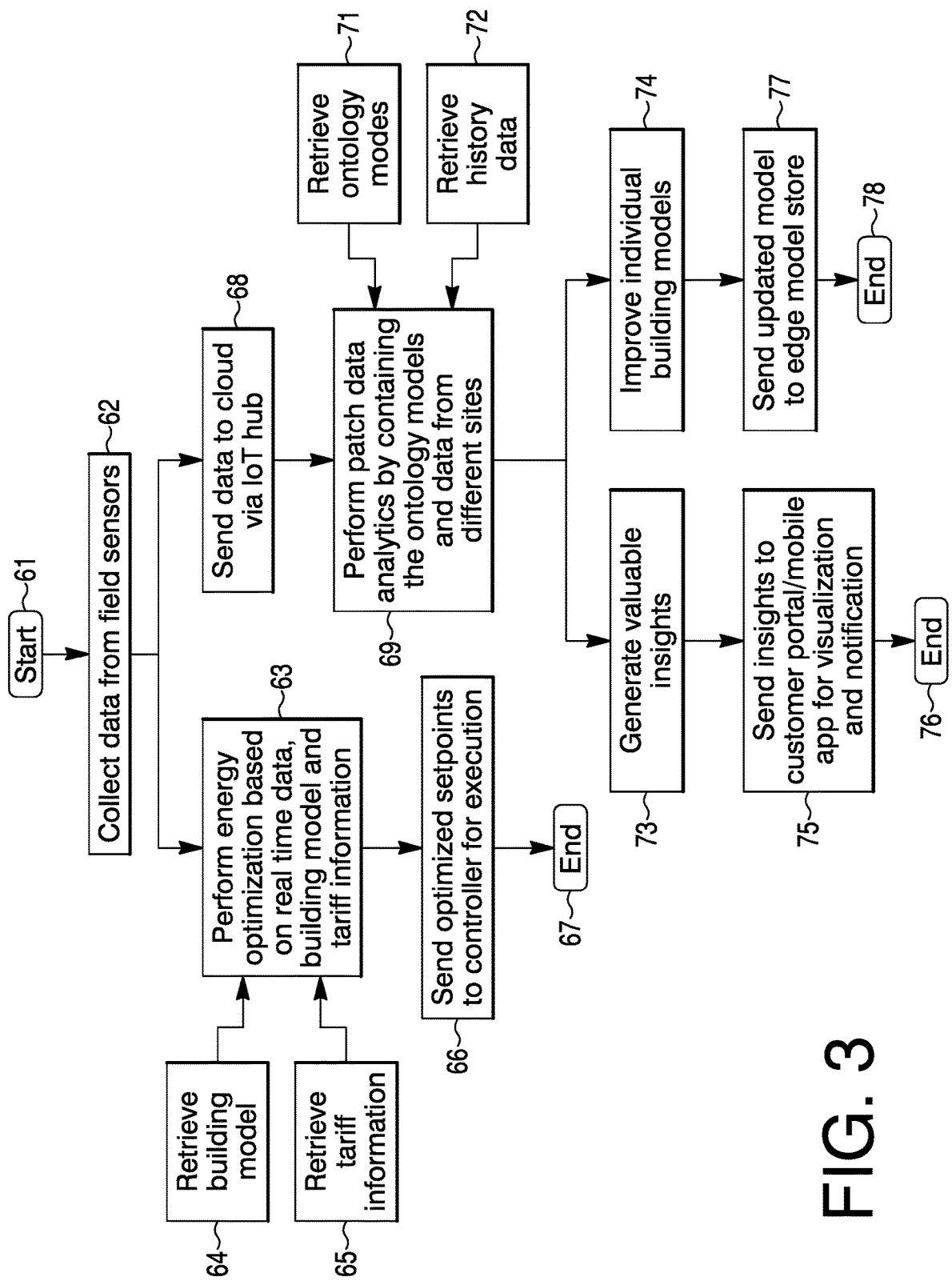
FIG. 3 is a diagram of a work flow of the present system block nomenclature.

FIG. 3 is a diagram of a work flow of the present system block nomenclature that may be used for illustrative purposes. From a start 61, one may go to block 62 to collect data from field sensors. The data from block 62 may go one or more of block 63 and block 64. At block 63, a building model may be retrieved from a block 64 and tariff information may be retrieved from a block 65. Optimized set points from block 63 may be sent by block 66 to a field controller and thus this flow may be ended as indicated by block 67.

From block 68 where data is sent to a cloud via IoT hub, a batch data analytics is performed by combining ontology models and data from different sites as indicated by a retrieval of ontology models at block 71 and retrieval of history data at block 72, according to block 69. Results of the analytics may go from block 69 to one or more of block 73 and block 74. Block 73 indicates generating valuable insights which may go to a block 75. Insights may be sent to a customer portal/mobile app for visualization and notification according to block 75. Then this process may end as indicated by block 76.

Block 74, which follows block 69, may improve individual building models. An updated module may go to an edge model store, in view of block 77. Then this process may end as indicated by block 78.

FIG. 4 is a diagram 81 of an example implementation of edge optimization. More particularly, the diagram is a sample of an edge optimization implementation in C# (C Sharp) language.

FIG. 5 is a diagram 82 of an example implementation of cloud analytics.

To recap, an integrated energy optimizer may incorporate an edge side and a cloud side. The edge side may have an energy optimizer, a building management system connected to the energy optimizer, a controller connected to the building management system, and equipment connected to the controller. The cloud side may have a cloud connected to the energy optimizer and to the building management system, and a user interface connected to the cloud. The optimizer may be configured to meet an energy demand with minimal cost based on current measurements of building parameters.

The energy optimizer may be connected to the cloud via a cloud connector. The building management system may be connected to the cloud via the cloud connector.

An optimization approach may incorporate collecting environmental data from field sensors at one or more sites, retrieving ontology models, retrieving historical data, performing batch data analytics on the ontology models and environmental data from the field sensors at the one or more sites, generating insights from the batch data analytics, sending insights to a customer interface for visualization and notification, and optimizing energy based on the environmental data, building models and cost information.

The field sensors may be placed at the one or more sites in a fashion so as to obtain environmental data of a building, facility, or an enclosed environment, relating to temperature, humidity, noise, fumes, physical disturbance, and/or other detectable parameters.

One or more building models may be built from the historical data using statistical regression with an on-the-fly environmental data estimation that is updated with environmental data collected.

Optimizing energy may be based on real time environmental data, building models and cost information, periodically, by minimizing the cost while meeting a predetermined comfort requirement for the one or more sites.

Periodically may mean a repetitive time period between one minute and sixty minutes.

The optimization approach may further incorporate sending the environmental data via an edge device and an IoT hub to a cloud.

The one or more building models may be generated locally in the edge side, or built remotely in the cloud side and then downloaded to an edge device.

At the cloud, a data analytics engine may perform the batch data analytics by combining one or more of the ontology models and environmental data from one or more sites and generate one or more insights from a group of items having performance monitoring and trending, fault detection and diagnosis, and improvement recommendations.

The one or more of the ontology models may be meta-data structures which describe properties of equipment in a building and their relationships.

An ontology model may help a data analytics engine to understand the building in details and generate insights, accordingly.

The optimizing energy may be based on model predictive control (MPC).

The optimizing energy may lead to optimal setpoints for controllers at the one or more sites.

An IoT hub energy optimizer may incorporate an optimizer connected to an IoT hub and a field bus, a building management system connected to the IoT hub and the field bus, a cloud connected to the IoT hub, and a user interface connected to the cloud. The field bus may be connected to at least one field sensor.

Data from the field sensor may go to the optimizer and the building management system. The data may be processed at the optimizer and the building management system for proper settings at the building management system.

The cloud may incorporate a data store connected to the IoT hub, an insight module connected to the IoT hub, an ontology model module, and a data analytics engine connected to the data store, the ontology model module, and the insight module. The insight module may provide one or more items selected from a group that incorporates performance monitoring, trending, fault detection, diagnosis, and improvement recommendations.

The user interface may be connected to the insight module.

The user interface may incorporate an application programmable interface (API) connected to the insight module, and a customer portal connected to the API.

The user interface may further incorporate a mobile app.

U.S. patent application Ser. No. 13/860,318, filed Apr. 10, 2013, and entitled "Supervisory Controllers for HVAC Systems", now U.S Pat. No. 10,101,048, issued Oct. 16, 2018, may be related to the present system. U.S. patent application Ser. No. 13/860,318, filed Apr. 10, 2013, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An integrated energy optimizer comprising:
   an edge side; and
   a cloud side; and
   wherein:
   the edge side comprises:
   an energy optimizer;
   a building management system connected to the energy optimizer;

a controller connected to the building management system; and equipment connected to the controller; and the cloud side comprises:

a cloud connected to the energy optimizer and to the building management system; and a user interface connected to the cloud; and wherein the optimizer is configured to meet an energy demand with minimal cost based on current measurements of building parameters.

2. The optimizer of claim 1, wherein:

the energy optimizer is connected to the cloud via a cloud connector; and the building management system is connected to the cloud via the cloud connector.

* * * * *